(12) United States Patent
McIlvaine et al.

(10) Patent No.: US 7,669,039 B2
(45) Date of Patent: Feb. 23, 2010

(54) USE OF REGISTER RENAMING SYSTEM FOR FORWARDING INTERMEDIATE RESULTS BETWEEN CONSTITUENT INSTRUCTIONS OF AN EXPANDED INSTRUCTION

(75) Inventors: Michael Scott McIlvaine, Raleigh, NC (US); James Norris Dieffenderfer, Apex, NC (US); Nathan Samuel Nunamaker, Durham, NC (US); Thomas Andrew Sartorius, Raleigh, NC (US); Rodney Wayne Smith, Raleigh, NC (US)

(73) Assignee: QUALCOMM Incorporated, San Diego ( * ) Notice: Subject to any disclaimer, the term of this patent is extended or adjusted under 35 U.S.C. 154(b) by 197 days.

(21) Appl. No.: 11/626,424

(22) Filed: Jan. 24, 2007

(65) Prior Publication Data
US 2008/0177987 A1  Jul. 24, 2008

(51) Int. Cl.
G06F 9/345 (2006.01)
(52) U.S. Cl. ..................... 712/217
(58) Field of Classification Search ............. 712/217
See application file for complete search history.

(56) References Cited

U.S. PATENT DOCUMENTS

| | | | |
|---|---|---|---|
| 5,586,278 A * | 12/1996 | Papworth et al. | 712/235 |
| 5,627,985 A * | 5/1997 | Fetterman et al. | 712/217 |
| 5,758,117 A * | 5/1998 | Patel et al. | 712/217 |
| 6,279,102 B1 | 8/2001 | Morrison | |
| 2003/0149862 A1 | 8/2003 | Kadambi | |
| 2004/0199753 A1 | 10/2004 | Thimmannagari et al. | |
| 2007/0050602 A1 * | 3/2007 | Lien et al. | 712/217 |

OTHER PUBLICATIONS

Alastruey et al., "Speculative Early Register Release", Conference On Computing Frontiers, Proceedings of the 3rd conference on Computing Frontiers, pp. 291-302, May 2006.*
Jones et al., "Compiler Directed Early Register Release", 14th International Conference on Parallel Architectures and Compilation Techniques, Sep. 17-21, 2005, IEEE, pp. 110-119.*
Smotherman M et al: "Improving CISC Instruction Decoding Performance Using a Fill Unit" Microarchitecture, 1995., Proceedings of the 28th Annual International Symposium on Ann Arbor, MI, USA Nov. 29-Dec. 1995, Los Alamitos, CA, USA, IEEE Comput. Soc, US Nov. 29, 2995. (Nov. 29, 1995), pp. 219-229, XP010151028, ISBN: 978-0-8186-7351-1.
International Search Report-PCT/US08/051958, International Search Authority-European Patent Office-May 21, 2008.
Written Opinion-PCT/US08/051958, International Search Authority-European Patent Office-May 21, 2008.

* cited by examiner

Primary Examiner—William M Treat
(74) Attorney, Agent, or Firm—Nicholas J. Pauley; Peter M. Kamarchik; Sam Talpalatsky

(57) ABSTRACT

Intermediate results are passed between constituent instructions of an expanded instruction using register renaming resources and control logic. A first constituent instruction generates intermediate results and is assigned a PRN in a constituent instruction rename table, and writes intermediate results to the identified physical register. A second constituent instruction performs a look up in the constituent instruction rename table and reads the intermediate results from the physical register. Constituent instruction rename logic tracks the constituent instructions through the pipeline, and delete the constituent instruction rename table entry and returns the PRN to a free list when the second constituent instruction has read the intermediate results.

19 Claims, 3 Drawing Sheets

USE OF REGISTER RENAMING SYSTEM FOR FORWARDING INTERMEDIATE RESULTS BETWEEN CONSTITUENT INSTRUCTIONS OF AN EXPANDED INSTRUCTION

BACKGROUND

The present invention relates generally to processors, and in particular to a system and method for utilizing existing register renaming resources to execute expanded instructions that pass partial results.

Processor instructions operate on data obtained from, and write their results to, memory. Modern processors utilize a hierarchical memory structure comprising a few fast, expensive memory elements, such as registers, at the top level. The memory hierarchy then comprises successively slower but more cost-effective memory technologies at lower levels, such as cache memories (SRAM), solid-state main memory (DRAM), and disks (magnetic or optical media), respectively. For applications such as portable electronic devices, DRAM is often the lowest level of the memory hierarchy.

Most processor instruction set architectures (ISA) include a set of General Purpose Registers (GPRs), which are architected registers used to pass data between instructions, and to and from memory. Instructions that perform logical and arithmetic operations on data read their operands from, and write their results to, specified GPRs. Similarly, memory access instructions read data to be stored to memory from GPRs, and write data loaded from memory to GPRs. A compiler assigns source and target GPR identifiers to each instruction, and orders the instructions, such that the proper results are calculated. That is, instructions are arranged in "program order" that guarantees correct results by directing earlier instructions to store results in specified GPRs, and directing later instructions to read those GPRs to obtain operands for further processing. The GPR identifiers are logical labels (e.g., r0-r15).

Some modern processor support "expanded" instructions—that is, instructions that perform more than a single arithmetic or logical operation. For example, the instruction ADD r1, r2, r3 LSL r4 implements the equation r1=r2+(r3<<[r4]), that is, left-shift the value in register r3 by the amount stored in r4, add this result to the value in r2, and store the sum in register r1. In a processor whose adder requires the full cycle time, this expanded instruction may be implemented as two separate, composite instructions—a shift instruction that left-shifts the value in r3, generating an intermediate result, and an add instruction that adds the intermediate result to the value in r2 and stores the sum in r1. In some processors—i.e., processors that support operand forwarding and only execute expanded instructions in program order—passing the intermediate results from the shift instruction to the add instruction is straightforward. In general, however—particularly in superscalar processors that support out of order instruction execution—additional resources, such as non-architected "scratch" registers and complex control logic, must be added to the processor to reliably implement the forwarding of intermediate results between constituent instructions of an expanded instruction.

SUMMARY

According to one or more embodiments described and claimed herein, the passing of intermediate results between constituent instructions of an expanded instruction is performed using register renaming resources and control logic. A first constituent instruction generates intermediate results and is assigned a PRN in a constituent instruction rename table, and writes intermediate results to the physical register. A second constituent instruction performs a look up in the constituent instruction rename table and reads the intermediate results from the physical register. Constituent instruction rename logic tracks the constituent instructions through the pipeline, and delete the constituent instruction rename table entry and returns the PRN to a free list when the second constituent instruction has read the intermediate results.

One embodiment relates to a method of executing an expanded instruction. The expanded instruction is converted into two or more separately executable constituent instructions. A physical register number is assigned to a first constituent instruction generating an intermediate result. The assigned physical register number is associated with a second constituent instruction receiving the intermediate result.

Another embodiment relates to a processor. The processor includes one or more instruction execution pipelines operative to execute an expanded instruction by generating a first constituent instruction generating intermediate results and a second constituent instruction receiving the intermediate results. The processor also includes a pool of physical registers, each having a physical register number, and a constituent instruction rename table operative to map instruction identifiers to physical register numbers. The processor further includes control logic operative to create an entry in the constituent instruction rename table for the first constituent instruction and further operative to perform a constituent instruction rename table lookup for the second constituent instruction. Intermediate results are passed from the first to the second constituent instructions via physical registers identified by the physical register numbers.

DETAILED DESCRIPTION

Figure 1:
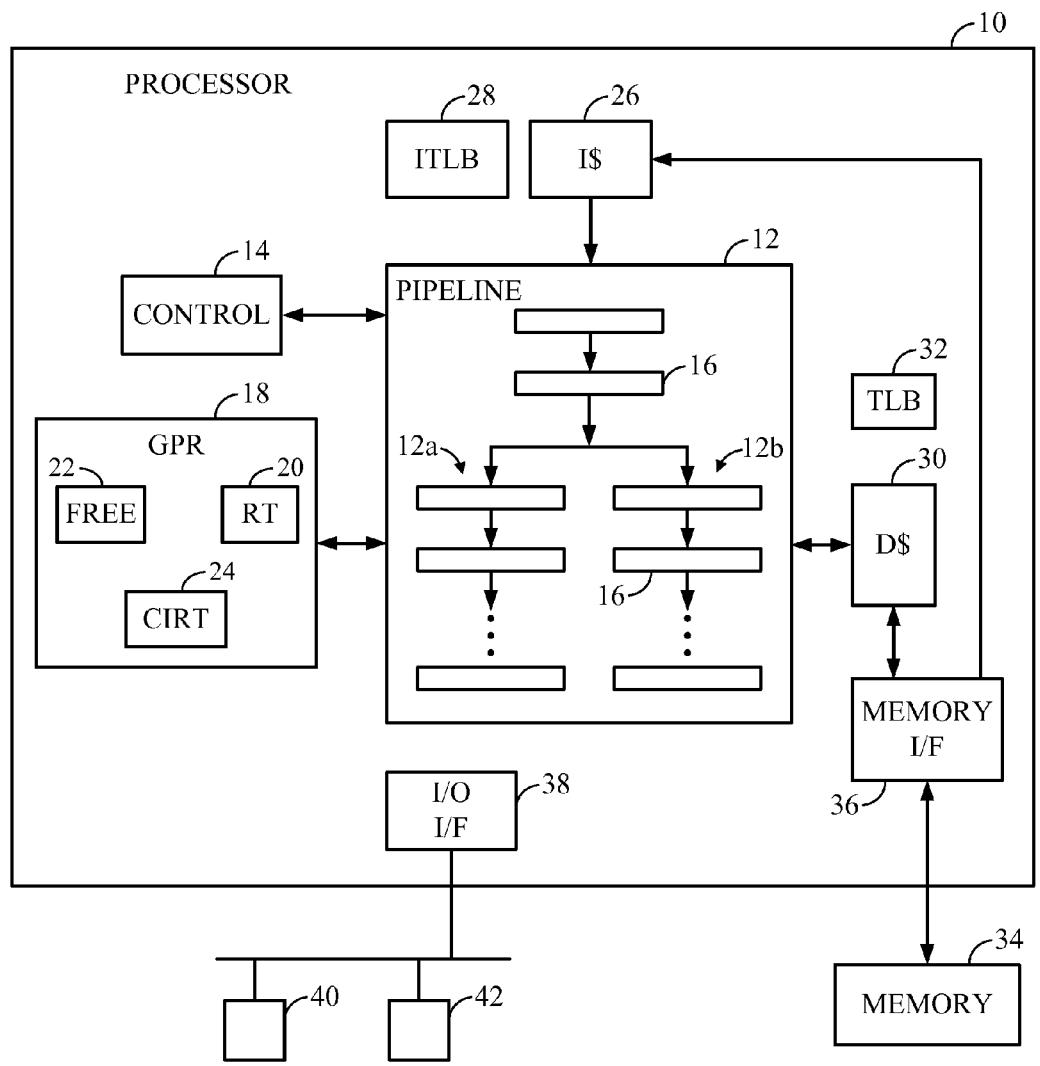
FIG. 1 is a functional block diagram of a processor utilizing register renaming resources to effect intermediate result passing between constituent instructions of an expanded instruction.

FIG. 1 depicts a functional block diagram of a processor 10 having logic to utilize register renaming resources to track the passing of intermediate results between constituent instructions generated by an expanded instruction. The processor 10 executes instructions in an instruction execution pipeline 12 according to control logic 14. The pipeline 12 may be a superscalar design, with multiple parallel lower pipelines 12a, 12b. The pipeline 12 includes various registers or latches 16, organized in pipe stages, as well as logical and computational circuits such as Arithmetic Logic Units (ALU) (not shown). A General Purpose Register (GPR) file 18 provides registers comprising the top of the memory hierarchy. As discussed herein, the GPR 18 may include a Renaming Table (RT) 20, a free list 22, and a Constituent Instruction Renaming Table (CITR) 24 to allow the use of register renaming resources to efficiently and reliably forward intermediate results between constituent instructions of expanded instructions.

The pipeline 12 fetches instructions from an Instruction Cache (I-Cache or I$) 26, with memory addressing and permissions managed by an Instruction-side Translation Lookaside Buffer (ITLB) 28. Data is accessed from a Data Cache (D-Cache or D$) 30, with memory addressing and permissions managed by a main Translation Lookaside Buffer (TLB) 32. In various embodiments, the ITLB 28 may comprise a copy of part of the TLB 32. Alternatively, the ITLB 28 and TLB 32 may be integrated. Similarly, in various embodiments of the processor 10, the I-cache 26 and D-cache 30 may be integrated, or unified.

Misses in the I-cache 28 and/or the D-cache 30 cause an access to main (off-chip) memory 34, under the control of a memory interface 36 (other caches, not shown, may be interposed between the processor 10 and main memory 34). The processor 10 may include an Input/Output (I/O) interface 38, controlling access to various peripheral devices 40, 42. Those of skill in the art will recognize that numerous variations of the processor 10 are possible. For example, the processor 10 may include a second-level (L2) cache for either or both the I and D caches 26, 30. In addition, one or more of the functional blocks depicted in the processor 10 may be omitted from a particular embodiment.

Many modern processors 10 execute instructions "out of order"—that is, in other than the instructions' program order—to fully utilize multiple pipelines 12a, 12b and improve overall performance. Out of order instruction execution raises numerous dependencies between instructions, known as "hazards." Data hazards arise when the reordering of instructions would change the order of access to the operand involved in the dependence. Data hazards may be classified into three types: Read after Write (RaW), Write after Write (WaW), and Write after Read (WaR). Note that the Read after Read (RaR) case is not a data hazard; reads may be performed in any order. Data hazards, such as RaW can also occur when the instructions are not reordered, but simply need to hold in a particular stage until their results have been written back or are ready for forwarding.

A known system for handling data hazards in processors 10 that support out of order instruction execution is register renaming. In a register renaming system, a large set or pool of physical registers, each having a physical register number (PRN), is managed by dynamically assigning logical register numbers (LRNs) to the physical registers. The LRNs may comprise, for example, the logical GPR identifiers (r0, r1, r2, ...). The number of physical registers is greater than the number of LRNs, or architected GPRs. A Renaming Table (RT) 20 maintains the dynamic mapping between LRNs and PRNs, and available PRNs are maintained in a free list 22.

Figure 2:
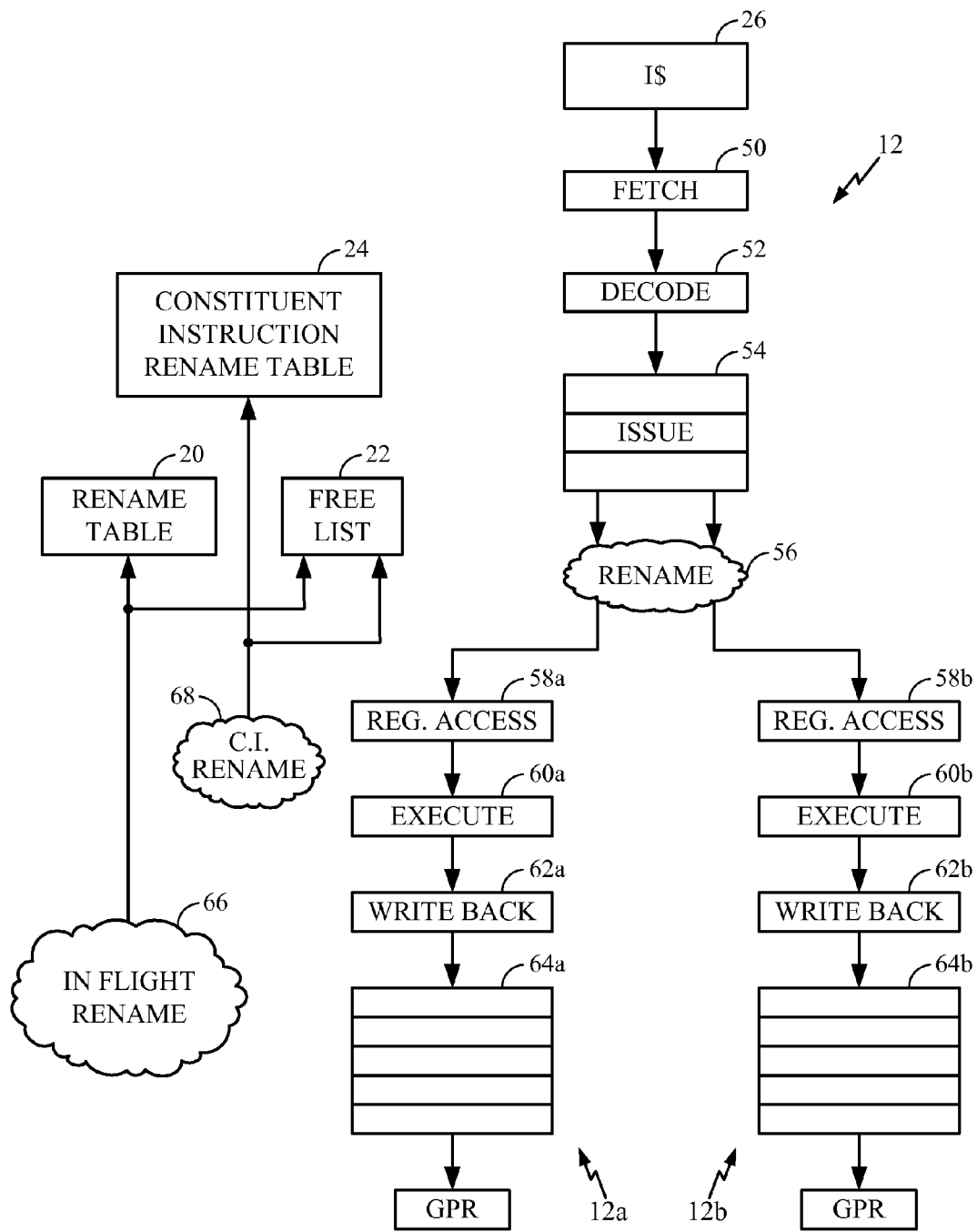
FIG. 2 is a functional block diagram of the pipeline of the processor of FIG. 1.

FIG. 2 depicts, in greater detail, a functional block diagram of the pipeline 12 and various register renaming resources. A fetch stage 50 of the pipeline 12 fetches instructions from the instruction cache 26. The instructions are decoded in a decode stage 52, and may enter an issue buffer 54. Instructions are issued from the issue buffer 54 into a pipeline 12a, 12b. Rename logic 56 inspects the register access characteristics of instructions, and translates the LRNs (e.g., GPR identifiers) associated with the instruction to PRNs as necessary, via the rename table 20 and free list 22. For instructions that write a register, a new physical register is selected from the free list 22, and a new LRN-to-PRN mapping is entered in the rename table 20. This maps the LRN to an unused PRN, so that the write is directed to an associated physical register (that is, the LRN is "renamed"). Instructions that read a register in a register access pipe stage 58a, 58b translate their LRN to a PRN via a rename table 20 lookup. The PRN remains associated with the register-reading instruction throughout its tenure through the pipeline 12a, 12b.

Register-writing instructions do not "corrupt" prior values written to the same LRN; the write is directed to a new, unused PRN (as the LRN is renamed to a new PRN). Instructions that follow the writing instruction in program order will be directed to the same PRN, to obtain the written value. Instructions preceding the writing instruction in program order were mapped by the rename table 20 to a different physical register (prior to the renaming operation), and will continue to access that physical register. Thus, instructions that write a given LRN may be executed ahead of instructions that read a prior value from the LRN (WaR) or write a prior result to the LRN (WaW).

When a register-writing instruction commits for execution at pipe stage 60a, 60b—that is, when the instruction ascertains neither it, nor any instruction ahead of it in program order, will cause an exception—the PRN assigned to it becomes the relevant architected GPR. The instruction will write its results to this PRN at write back pipe stage 62a, 62b (perhaps after a write buffer 64a, 64b). At this point, any older renaming of the same LRN (GPR identifier) to other PRNs is removed from the rename table 20. When all instructions reading the GPR complete execution, the PRN is returned to the free list 22, as an available resource for another rename operation. The in-flight rename logic 66 performs these functions by monitoring the pipeline 12 as instructions commit for execution, and sending the proper control signals to the rename table 20 and free list 22.

According to one or more embodiments, the register rename system is utilized to provide for the forwarding of intermediate results between constituent instructions generated from expanded instructions. When an expanded instruction is decoded at pipe stage 52, two or more constituent instructions may be generated and passed into the instruction issue buffer 54. The constituent instructions may be flagged as to which generate one or more intermediate results, and which receive intermediate results as operands. The rename logic 56 inspects the constituent instructions, and assigns one or more PRNs from the free list 22 to constituent instructions that generate intermediate results. The rename logic 56 additionally creates an entry in a constituent instruction rename table 24 that maps an indicator identifying the constituent instruction generating an intermediate result to the assigned PRN. The rename logic 56 further tags constituent instructions that receive intermediate results with the indicator identifying the constituent instruction generating intermediate results.

When the constituent instructions receiving intermediate results reach the register access pipe stage 58a, 58b, the instructions access the constituent instruction rename table 24 to retrieve the PRN identifying the register that holds their intermediate results. When the constituent instructions receiving intermediate results commit for execution at pipe stage 60a, 60b, constituent instruction rename logic 68 removes the relevant entry from the constituent instruction rename table 24, and returns the PRN to the free list 22. Note that although the constituent instruction rename table 24 is depicted in FIG. 2 as an independent functional entity, in some embodiments, the functionality may be included in the rename table 20. In this case, constituent instructions of expanded instructions that generate and receive intermediate results are treated as a special case of register renaming, with an instruction identifier rather than a LRN being renamed. In other embodiments, the constituent instruction register renaming may be separate from the register renaming, with a separate pool of physical registers and a separate free list 22 dedicated to expanded instructions.

Figure 3:
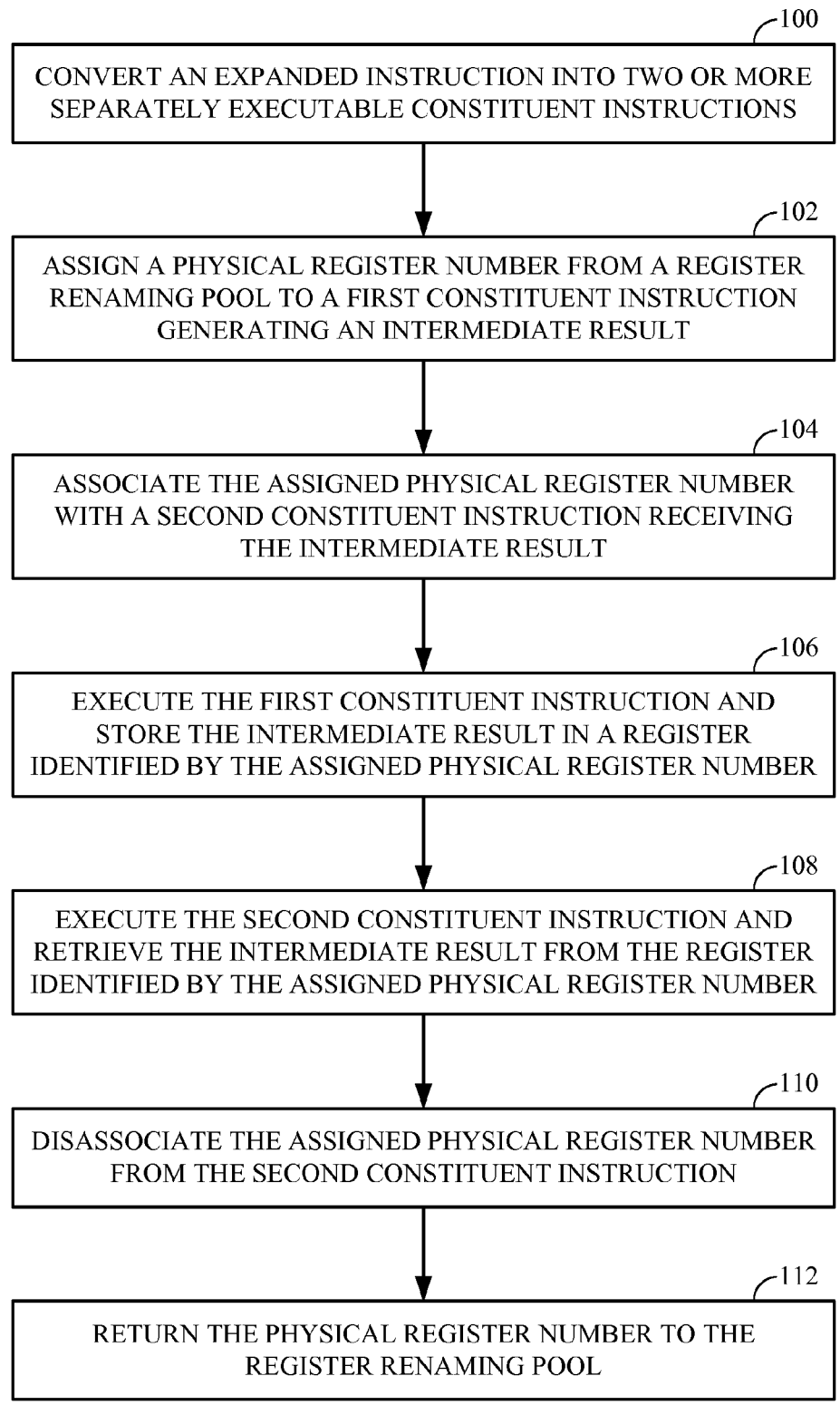
FIG. 3 is a flow diagram of a method of executing an expanded instruction.

FIG. 3 depicts a method of executing an expanded instruction. The expanded instruction is converted into two or more separately executable constituent instructions (block 100). A first constituent instruction generating an intermediate result is assigned a PRN (block 102). In one embodiment, the PRN is selected from a register renaming pool. The assigned PRN is associated with a second constituent instruction receiving the intermediate result (block 104). The association may be via an entry in a constituent instruction rename table 24, or a rename table 20 of a register renaming system.

The first constituent instruction is then executed (block 106), and the intermediate result it generates is stored in the register identified by the assigned PRN. The second constituent instruction is executed (block 108), retrieving the intermediate result from the register identified by the assigned PRN. Those of skill in the art will recognize that block 106 and 108 may be implemented by operand forwarding, using the assigned PRN to identify instructions, without actually writing the intermediate results to a physical register.

After the second constituent instruction has received the intermediate result, the PRN is disassociated from the second constituent instruction (block 110), such as by removing the relevant entry from the constituent instruction rename table 24 (or register rename table 20). The PRN is then returned to the register renaming pool (block 112), such as by returning the PRN to the free list 22. The PRN may be disassociated from the second constituent instruction and returned to the free list 22 as soon as the second constituent instruction reads the intermediate result during its execution, or at any later time.

By utilizing the resources and methodology of existing register renaming systems, as described herein, expanded instructions may be executed as two or more constituent instructions without the need for extensive additional processor resources and logic to effect the passing of intermediate results between the constituent instructions. Although described herein in terms of two constituent instructions passing a single intermediate result, those of skill in the art will readily recognize that the present invention is not limited to this embodiment. In general, a large number of constituent instructions may be generated from any expanded instruction, and the constituent instructions may pass a large number of intermediate results between themselves, utilizing the register renaming system, as described herein.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of executing an expanded instruction in a system with a rename table, a free list, and a constituent instruction rename table, comprising: converting the expanded instruction into a plurality of separately executable constituent instructions including a first constituent instruction and a second constituent instruction; assigning a physical register number associated with a physical register to the first constituent instruction by mapping an identifier of the first constituent instruction to the physical register number in the constituent instruction rename table, wherein the first constituent instruction is to generate an intermediate result; and associating the assigned physical register number with the second constituent instruction, wherein the second constituent instruction is to receive the intermediate result.

2. The method of claim 1, further comprising executing the first constituent instruction to generate the intermediate result.

3. The method of claim 2, further comprising using the assigned physical register number to forward the intermediate result as an operand of the second constituent instruction without storing the intermediate result in the physical register.

4. The method of claim 3, wherein assigning the physical register number to the first constituent instruction comprises creating an entry in a constituent instruction rename table that maps the identifier of the first constituent instruction to the physical register number, and further comprising receiving the intermediate result by the second constituent instruction without performing a lookup in the constituent instruction rename table.

5. The method of claim 2, further comprising storing the intermediate result to the physical register.

6. The method of claim 5, further comprising executing the second constituent instruction, wherein executing the second constituent instruction includes retrieving the intermediate result from the physical register.

7. The method of claim 1, wherein assigning the physical register number to the first constituent instruction comprises creating an entry in a constituent instruction rename table that maps the identifier of the first constituent instruction to the physical register number.

8. The method of claim 7, wherein the physical register number is selected from a list of available physical registers.

9. The method of claim 1, further comprising executing the second constituent instruction, wherein executing the second constituent instruction further comprises performing a lookup in a constituent instruction rename table using the identifier of the first constituent instruction.

10. The method of claim 1, further comprising releasing the physical register number from assignment to the first constituent instruction after the second constituent instruction reads the intermediate result.

11. The method of claim 10, wherein releasing the physical register number comprises adding the physical register number to a list of available physical registers.

12. The method of claim 1, wherein associating the assigned physical register number with the second constituent instruction comprises tagging the second constituent instruction with the identifier of the first constituent instruction.

13. A processor comprising: a rename table, a free list, a constituent instruction rename table, an instruction execution pipeline operative to execute an expanded instruction by converting the expanded instruction to a first constituent instruction and a second constituent instruction, wherein the first constituent instruction is to generate an intermediate result and the second constituent instruction is to receive the intermediate result; and a physical register to store the intermediate result generated by the first constituent instruction, wherein the physical register has an associated physical register number; and rename logic to assign the physical register number to the first constituent instruction by mapping in the constituent instruction rename table an identifier of the first constituent instruction to the physical register number and associating the physical register number with the second constituent instruction; wherein the second constituent instruction is to receive the intermediate result.

14. The processor of claim 13, wherein control logic is operative to return the physical register number to the free list after the second constituent instruction receives the intermediate result.

15. The processor of claim 13, wherein a constituent instruction rename table entry of a constituent instruction rename table maps the first constituent instruction identifier associated with the first constituent instruction to the physical register number.

16. The processor of claim 13, wherein the first constituent instruction writes the intermediate result to the physical register.

17. The processor of claim 13, wherein the second constituent instruction reads the intermediate result from the physical register.

18. The processor of claim 15, wherein the second constituent instruction is to retrieve the physical register number via a constituent instruction rename table lookup at the constituent instruction rename table using the identifier of the first constituent instruction.

19. The processor of claim 15, wherein the constituent instruction rename table entry is removed from the constituent instruction rename table after the second constituent instruction has received the intermediate result.

\* \* \* \* \*